(12) United States Patent
Zhang et al.

(10) Patent No.: US 12,144,031 B2
(45) Date of Patent: Nov. 12, 2024

(54) COMMUNICATION METHODS AND APPARATUSES

(71) Applicant: Lenovo (Beijing) Ltd., Beijing (CN)

(72) Inventors: Yuantao Zhang, Dongcheng District (CN); Hongmei Liu, Changping District (CN); Zhi Yan, Xicheng District (CN); Yingying Li, Haidian District (CN); Haipeng Lei, Haidian District (CN); Haiming Wang, Xicheng District (CN)

(73) Assignee: Lenovo (Beijing) Ltd., Beijing (CN)

( * ) Notice: Subject to any disclaimer, the term of this patent is extended or adjusted under 35 U.S.C. 154(b) by 361 days.

(21) Appl. No.: 17/775,782

(22) PCT Filed: Nov. 15, 2019

(86) PCT No.: PCT/CN2019/118809
§ 371 (c)(1),
(2) Date: May 10, 2022

(87) PCT Pub. No.: WO2021/092903
PCT Pub. Date: May 20, 2021

(65) Prior Publication Data
US 2022/0418000 A1 Dec. 29, 2022

(51) Int. Cl.
*H04W 74/0833* (2024.01)
*H04L 5/00* (2006.01)
*H04W 56/00* (2009.01)

(52) U.S. Cl.
CPC ......... *H04W 74/0833* (2013.01); *H04L 5/001* (2013.01); *H04L 5/0048* (2013.01);
(Continued)

(58) Field of Classification Search
CPC .......... H04W 74/0833; H04W 56/0015; H04L 5/001; H04L 5/0048; H04L 5/0053; H04L 5/0094; H04L 5/0007; Y02D 30/70
See application file for complete search history.

(56) References Cited

U.S. PATENT DOCUMENTS

| | | | |
|---|---|---|---|
| 2019/0141695 A1 | 5/2019 | Babaei et al. | |
| 2019/0159175 A1* | 5/2019 | Islam | H04W 72/02 |
| 2019/0215869 A1* | 7/2019 | Lin | H04L 5/001 |
| 2019/0261425 A1 | 8/2019 | Park et al. | |

(Continued)

FOREIGN PATENT DOCUMENTS

| | | |
|---|---|---|
| CN | 108633096 A | 10/2018 |
| CN | 109413755 A | 3/2019 |

(Continued)

OTHER PUBLICATIONS

PCT/CN2019/118809, "International Preliminary Report on Patentability", PCT Application No. PCT/ CN2019/118809, May 27, 2022, 5 pages.

(Continued)

*Primary Examiner* — Abdullahi Ahmed
(74) *Attorney, Agent, or Firm* — FIG. 1 Patents

(57) ABSTRACT

Embodiments of the present application relate to a method and an apparatus for random access procedure. According to an embodiment of the present application, a method can include: receiving, at a user equipment (UE), synchronization information; and determining an initial uplink (UL) bandwidth part (BWP) for the UE based on a random access channel (RACH) occasion associated with the synchronization information. Embodiments of the present application provide methods for determining an initial UL BWP for the UE. Accordingly, embodiments of the present application can facilitate the implementation of the random access procedure for the NR-Light UE.

20 Claims, 11 Drawing Sheets

(52) U.S. Cl.
CPC .......... *H04L 5/0053* (2013.01); *H04L 5/0094* (2013.01); *H04W 56/0015* (2013.01)

(56) References Cited

U.S. PATENT DOCUMENTS

| | | | |
|---|---|---|---|
| 2021/0007152 A1* | 1/2021 | Park | H04L 27/2607 |
| 2022/0264589 A1* | 8/2022 | Sun | H04W 72/535 |
| 2022/0286191 A1* | 9/2022 | Wei | H04W 56/001 |
| 2023/0189346 A1* | 6/2023 | Park | H04W 72/046 370/329 |
| 2023/0189348 A1* | 6/2023 | Kim | H04W 48/08 370/329 |
| 2023/0300888 A1* | 9/2023 | Lee | H04W 74/0891 370/329 |

FOREIGN PATENT DOCUMENTS

| | | | |
|---|---|---|---|
| CN | 109803396 A | 5/2019 | |
| CN | 110249708 A | 9/2019 | |
| WO | 2019050316 A1 | 3/2019 | |

OTHER PUBLICATIONS

PCT/CN2019/118809, "International Search Report and Written Opinion", PCT Application No. PCT/CN2019/118809, Aug. 11, 2020, 6 pages.

Qualcomm Incorporated, "Open Issues on BWP", 3GPP TSG RAN WG1 #91, R1-1720693, Reno, NV, USA, Nov. 2017, 15 pages.

19952251, "Extended European Search Report", EP Application No. 19952251, Jul. 12, 2023, 8 pages.

201980101848.4, "Foreign Office Action", CN Application No. 201980101848.4, Jun. 14, 2024, 25 pages.

Qualcomm Incorporated, "Remaining control plane issues of BWP", 3GPP TSG-RAN WG2 Meeting #100, R2-1713885, Reno, USA, Nov. 2017, 7 pages.

* cited by examiner

COMMUNICATION METHODS AND APPARATUSES

TECHNICAL FIELD

Embodiments of the present application generally relate to wireless communication technology, and in particular to a method and an apparatus for random access procedure.

BACKGROUND

A user equipment (UE) can initialize access to a base station (BS) by a random access procedure. During the random access procedure, the UE may transmit a preamble on a random access channel (RACH), then the UE may receive uplink grant, time synchronization signal, or other information from the BS. Such UE may also refer to a legacy UE (or a regular UE, or a normal UE), which may include a mobile phone, a tablet or other communication devices. The regular UE may require relatively great bandwidth to perform signal transmission (e.g. downlink (DL) transmission).

In another scenario, for example, an NR-Light scenario, an NR-Light UE is introduced. The NR-Light UE may refer to a UE that can perform signal transmission (e.g. downlink (DL) transmission) within a relatively less bandwidth (e.g. from some Mbps to tens of Mbps), operate with less power consumption, operate with less resource, or operate with flexible latency requirement, etc.

However, the RACH used by regular UE may not be used by the NR-Light UE, which occupies relatively less bandwidth. Therefore, a new random access procedure should be required for NR-Light UE.

SUMMARY OF THE APPLICATION

Some embodiments of the present application provide a technical solution for a random access procedure for NR-Light UE.

According to some embodiments of the present application, a method may include: receiving, at a user equipment (UE), synchronization information; and determining an initial uplink (UL) bandwidth part (BWP) for the UE based on a random access channel (RACH) occasion associated with the synchronization information.

In an embodiment of the present application, determining the initial UL BWP for the UE may include determining the initial UL BWP for the UE to be an initial downlink (DL) BWP for the UE in the case that the RACH occasion is within the initial DL BWP for the UE.

In another embodiment of the present application, determining the initial UL BWP for the UE may include determining a first PRB of the initial UL BWP to be a first PRB of the RACH occasion.

In yet another embodiment of the present application, determining the initial UL BWP for the UE may include determining a last physical resource block (PRB) of the initial UL BWP to be a last PRB of the RACH occasion.

In yet another embodiment of the present application, determining the initial UL BWP for the UE may include determining a centre PRB of the initial UL BWP to be a first PRB of the RACH occasion.

According to some other embodiments of the present application, a method may include: transmitting, to a user equipment (UE), synchronization information; and determining an initial uplink (UL) bandwidth part (BWP) for the UE based on a random access channel (RACH) occasion associated with the synchronization information.

Some embodiments of the present application also provide an apparatus, include: at least one non-transitory computer-readable medium having computer executable instructions stored therein, at least one receiver; at least one transmitter; and at least one processor coupled to the at least one non-transitory computer-readable medium, the at least one receiver and the at least one transmitter. The computer executable instructions are programmed to implement any method as stated above with the at least one receiver, the at least one transmitter and the at least one processor.

Embodiments of the present application provide a technical solution for determining an initial UL BWP for the UE. Accordingly, embodiments of the present application can facilitate the implementation of the random access procedure for the NR-Light UE.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application, and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
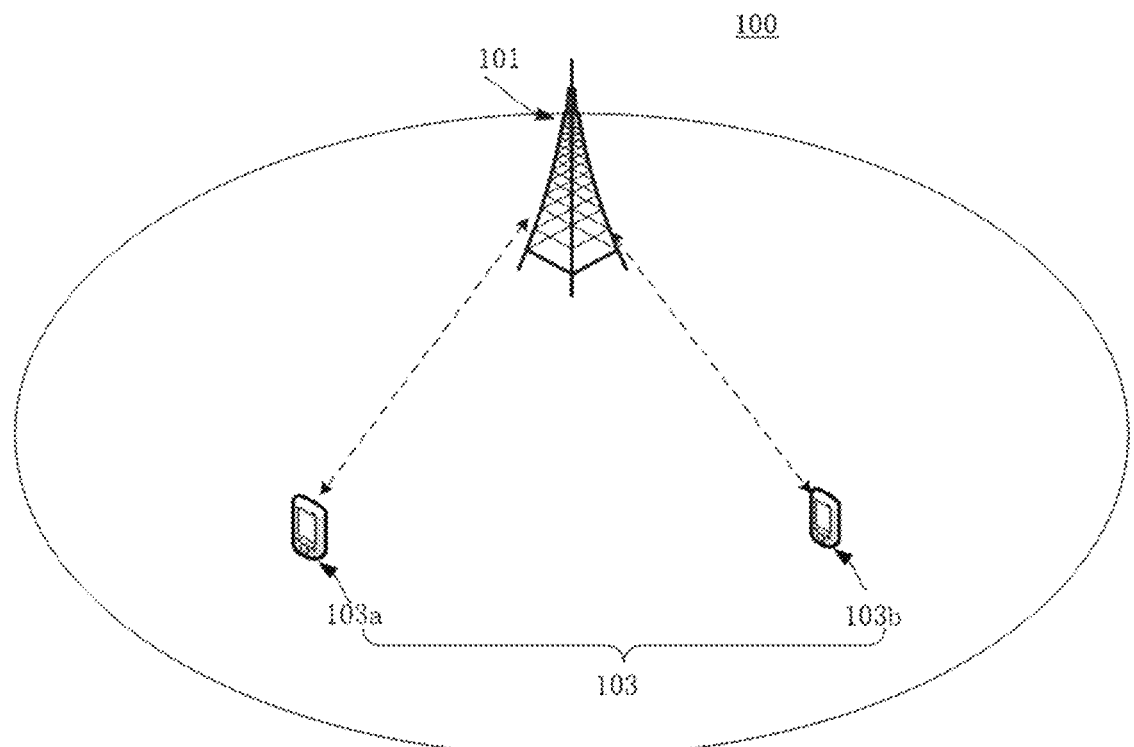
FIG. 1 is a schematic diagram illustrating an exemplary wireless communication system according to some embodiments of the present application.

FIG. 1 is a schematic diagram illustrating an exemplary wireless communication system 100 according to an embodiment of the present application.

As shown in FIG. 1, the wireless communication system 100 can include at least one base station (BS) 101 and at least one UE 103. Although a specific number of BSs 101 and UEs 103, e.g., only one BS 101 and two UEs 103 (e.g., UE 103a and UE 103b) are depicted in FIG. 1, one skilled in the art will recognize that any number of the BSs 101 and UEs 103 may be included in the wireless communication system 100.

The BS 101 may be distributed over a geographic region, and generally be a part of a radio access network that may include one or more controllers communicably coupled to one or more corresponding BSs 102. In some embodiments of the present application, each BS 102 may also be referred to as an access point, an access terminal, a base, a macro cell, a Node-B, an evolved Node B (eNB), a gNB, a Home Node-B, a relay node, a device, or described using other terminology used in the art.

The UE 103a may be a normal UE (or regular UE) compatible with existing technology. For example, the UE 103a may be computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 103a may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE 103a may be a wearable device, such as a smart watch, a fitness band, an optical head-mounted display, or the like. Moreover, the UE 103a may be referred to as a subscriber unit, a mobile, a mobile station, a user, a terminal, a mobile terminal, a wireless terminal, a fixed terminal, a subscriber station, a user terminal, or a device, or described using other terminology used in the art.

The UE 103b may be a NR-Light UE. Compared with the normal UE 103a, the NR-Light UE 103b may have smaller bandwidth to enable several Mbps to tens of Mbps downlink (DL) throughput, lower power consumption to enable longer UE battery life, cost reduction, relaxed latency requirement, etc. For example, the UE 103b may be an industrial sensor, a smart wearable, a video surveillance, or other devices with the characteristics of NR-Light UE.

Figure 2:
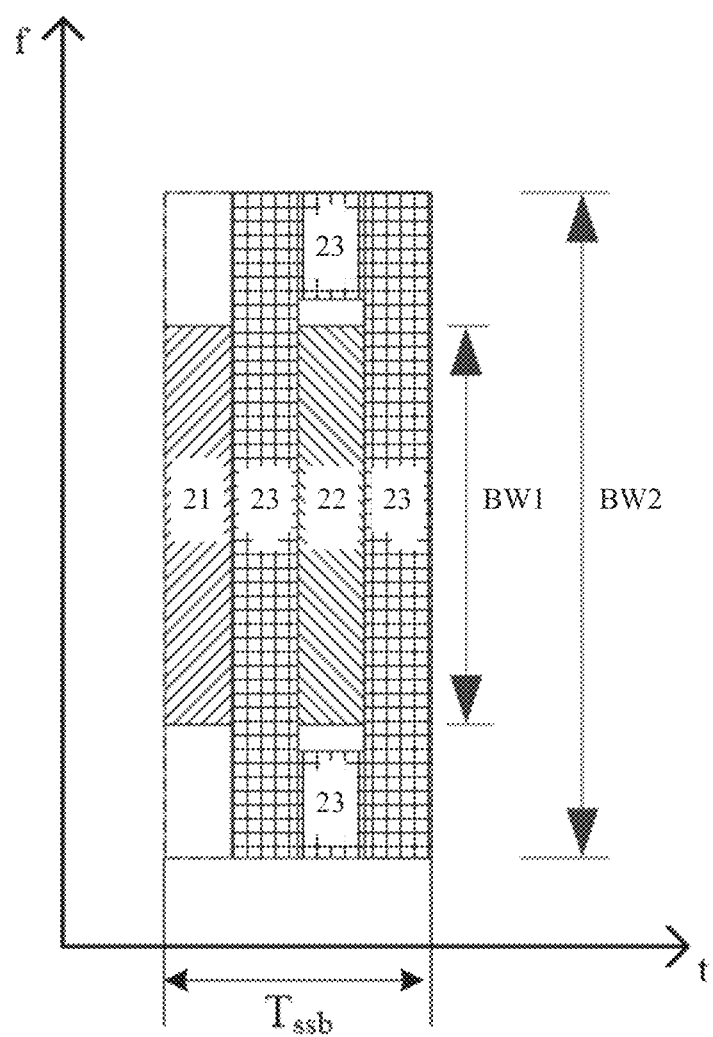
FIG. 2 illustrates a structure of a synchronization signal block (SSB) according to some embodiments of the present application.

The BS 101 may transmit synchronization information to the UE 103a and UE 103b for initial accesses of the UE 103a and UE 103b to the BS 101. The synchronization information may include one or more synchronization signal blocks (SSBs) as shown in FIG. 2. Each SSB may be associated with a beam transmitted from the BS 101.

FIG. 2 illustrates a structure of a SSB according to some embodiments of the present application.

According to FIG. 2, the horizontal axis t may represent the time domain and the vertical axis f may represent the frequency domain. The SSB may have a time length $T_{ssb}$ in the time domain. $T_{ssb}$ may include one or more orthogonal frequency division multiplexing (OFDM) symbols (for example, 4 OFDM symbols). The SSB may have a bandwidth BW2 in the frequency domain. The BW2 may include one or more physical resource blocks (PRBs) (for example, 20 PRBs).

Referring to FIG. 2, the SSB may include a primary synchronization signal (PSS) 21, a secondary synchronization signal (SSS) 22, and a signal transmitted on the physical broadcast channel (PBCH) 23. Each of the PSS 21 and the SSS 22 may have a bandwidth BW1 less than the BW2 in the frequency domain. The BW1 may include one or more PRBs (for example, 12 PRBs) in the frequency domain. The PBCH 23 may have the bandwidth BW2 in the frequency domain.

The signal transmitted on the PBCH 23 may include master information block (MIB) information. The MIB information may include configuration information for a control resource set (CORESET) (e.g., CORESET #0) for initial accesses of the UEs 103. CORESET #0 may indicate the frequency resource on which system information block1 (SIB1) information is transmitted. The SIB1 information may configure one or more RACH occasions (ROs). Accordingly, each SSB may be associated with one or more ROs. Each RO may include one or more OFDM symbols in the time domain and one or more PRBs in the frequency domain. The number of the OFDM symbols in the time domain and the number of the PRBs in the frequency domain of each RO may be determined based on the RACH configuration information from the base station.

For NR, a wideband carrier may be divided into one or more subbands. Each subband may be referred to as a "bandwidth part (BWP)".

The bandwidth of the initial downlink (DL) BWP for the initial access of the NR-Light UE (e.g., UE 103b) may be higher than or equal to the bandwidth of the SSB (for example, 20 RPBs in total and the actual bandwidth depends on numerology), but is lower than the bandwidth of the initial DL BWP for the initial access of the normal UE (e.g., UE 103a). The bandwidth of the initial DL BWP of the normal UE may be the same as the bandwidth of the CORESET #0, which is configured in MIB information as defined in TS38.331. For example, the bandwidth of CORESET #0 may be 24 PRBs as the minimum value and up to 96 PRBs as the maximum value. The number of the PRBs for the CORESET #0 may depend on the configuration information from the base station.

Figure 3:
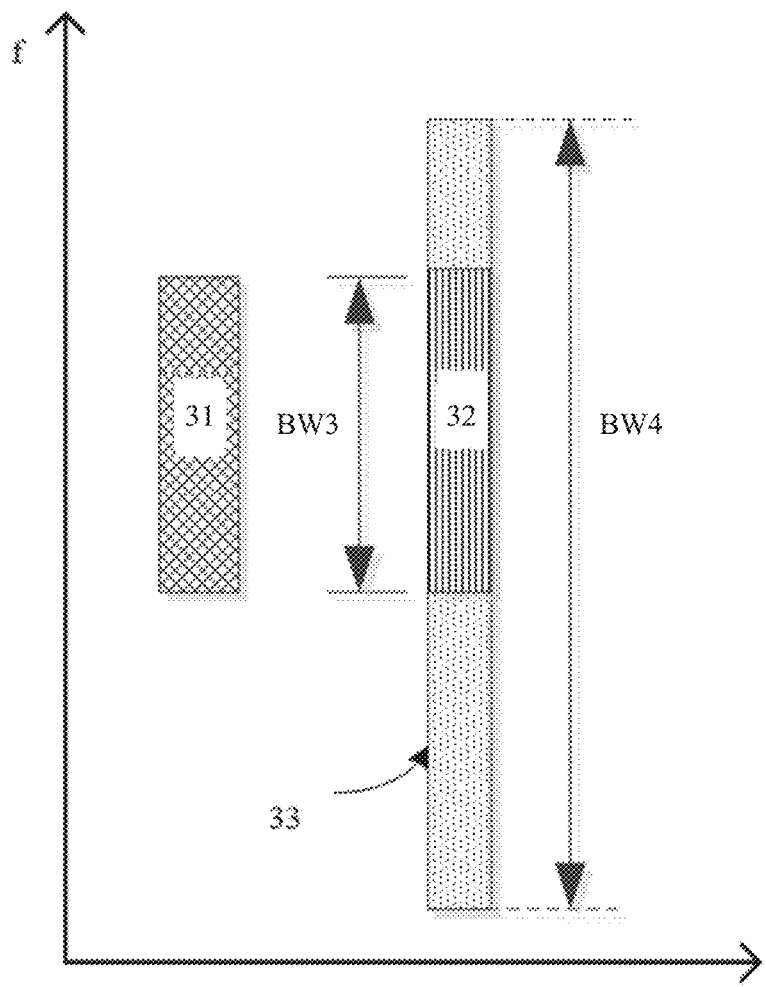
FIG. 3 illustrates initial DL BWPs for a normal UE and a NR-Light UE according to some embodiments of the present application.

FIG. 3 illustrates initial DL BWPs for a normal UE and a NR-Light UE according to some embodiments of the present application. As shown in FIG. 3, the horizontal axis t may represent the time and the vertical axis f may represent the frequency domain. As shown in FIG. 3, reference sign 32 may refer to the initial DL BWP for the NR-Light UE, which has a bandwidth BW3 (e.g., 20 PRBs). Reference sign 33 may refer to the initial DL BWP for the normal UE, which has a bandwidth BW4 (e.g., 24 PRBs). Referring to FIG. 3, the bandwidth BW3 may be equal to or larger than the bandwidth of SSB 31, but is within the bandwidth BW4.

For the NR system with an unpaired spectrum, it is assumed that the downlink BWP for the UE and the uplink BWP for the UE may have the same centre frequency. Following this principle, the initial UL BWP used for initial access of the NR-Light UE may be the same as the initial DL BWP for the NR-Light UE, which is lower than the bandwidth defined from CORESET #0. However, the SSB(s) transmitted from the base station is used for initial accesses of both the normal UEs and the NR-Light UEs, which means that the one or more ROs may be configured throughout the whole bandwidth of CORESET #0. This leads to an issue that some ROs, which are associated with certain SSBs, are located outside of the initial UL BWP for the NR-Light UEs if following the same rule as in legacy for initial UL BWP determination.

Figure 4:
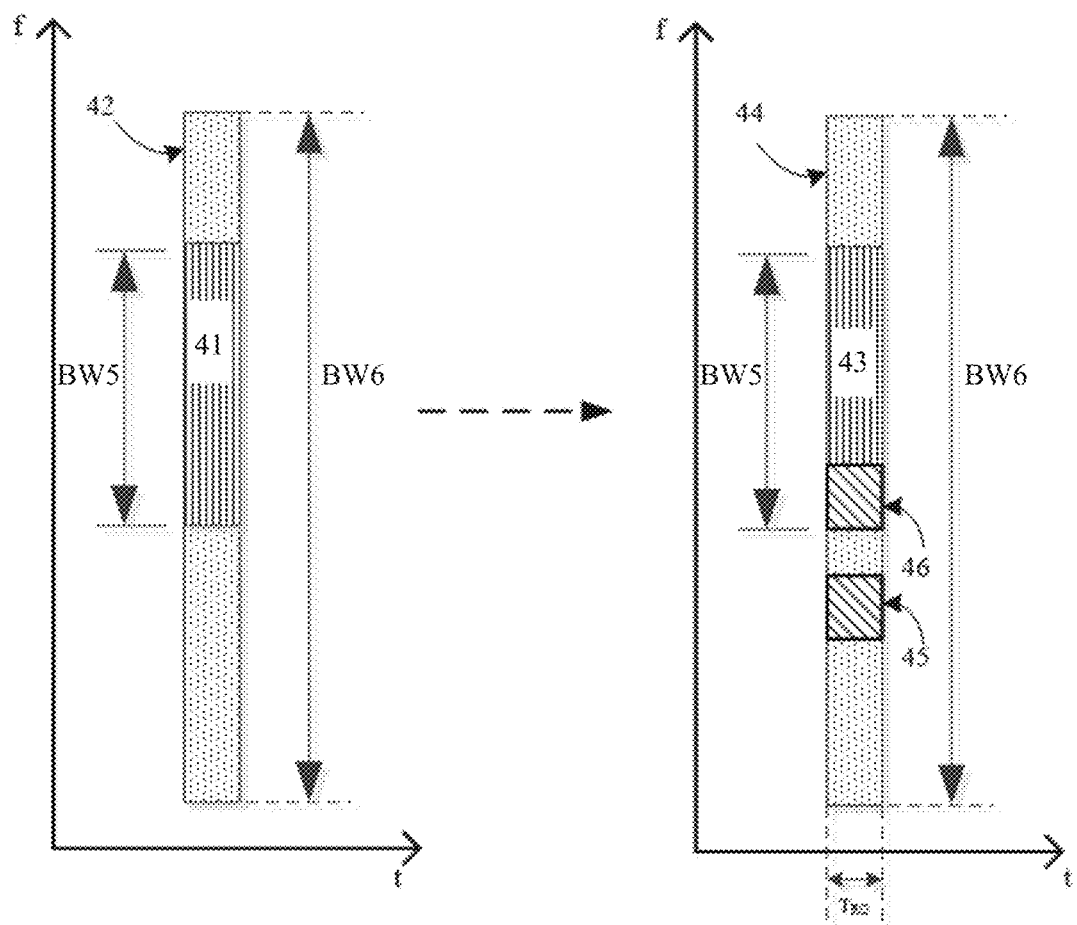
FIG. 4 illustrates a method for determining an initial UL BWP for a NR-Light UE according to some embodiments of the present application.

For example, FIG. 4 illustrates a method for determining an initial UL BWP for a NR-Light UE according to some embodiments of the present application. As shown in FIG. 4, the horizontal axis t may represent the time and the vertical axis f may represent the frequency domain. Reference sign 41 may refer to the initial DL BWP of the NR-Light UE, which may have a bandwidth BWS. Reference sign 42 may refer to the initial DL BWP of the normal UE, which may have a bandwidth BW6. Following the same rule as in legacy for initial UL BWP determination, the initial UL BWP 43 of the NR-Light UE (e.g., UE 103b) should be the same as the initial DL BWP 41 of the NR-Light UE, and they both have the same bandwidth BWS. Similarly, the initial UL BWP 44 of the normal UE (e.g., UE 103a) should be the same as the initial DL BWP 42 of the normal UE, and they both have the same bandwidth BW6.

Reference sign 45 may refer to RO #0 which is associated with SSB #0. Reference sign 46 may refer to RO #1 which is associated with SSB #1. As shown in FIG. 4, each of RO #0 and RO #1 may have the time length $T_{RO}$ in the time domain. $T_{RO}$ may include one or more OFDM symbols. Each of RO #0 and RO #1 may also have one or more PRBs in the frequency domain. Since the ROs are configured based on the bandwidth of initial DL BWP (i.e., the bandwidth of CORESET #0) of the normal UE, rather than based on the bandwidth of the initial DL BWP of the NR-Light UE, some ROs may located outside the initial UL BWP for the NR-Light UE. For example, referring to FIG. 4, RO #1 is located inside of the initial UL BWP for the NR-Light UE while RO #0 is located outside of the initial UL BWP for the NR-Light UE.

For the NR-Light UE which detects SSB #0 from the associated beam which has the best signal quality, it should use RO #0 for the RACH preamble transmission. However, RO #0 is located outside of initial UL BWP of the NR-Light UE and is not available for the RACH preamble transmission.

Embodiments of the present application can provide technical solutions at least solving the above technical problems. More details on the embodiments of the present application will be illustrated in the following text in combination with the appended drawings.

Figure 5:
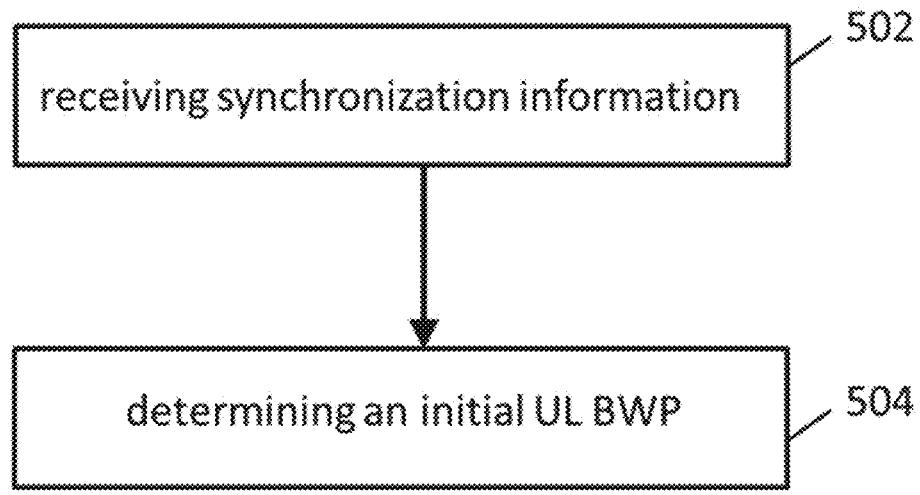
FIG. 5 illustrates a method for a random access procedure according to some embodiments of the present application.

FIG. 5 is a flow chart illustrating a method for a random access procedure according to some embodiments of the present application. The method may be performed by a NR-Light UE, for example, the UE 103b as shown in FIG. 1.

As shown in FIG. 5, in step 502, the UE 103b may receive synchronization information from a base station (for example, the base station 101 as shown in FIG. 1). The synchronization information may include one or more SSBs. Each SSB may be associated with a beam transmitted from the BS 101.

After receiving the synchronization information, the UE 103b may determine one SSB transmitted through the best beam. The best beam may refer to the beam with the best signal quality. Then, the UE 103b may obtain one or more ROs associated with one SSB transmitted through the best beam. According to some embodiments of the present application, one SSB may be associated with one RO. In this case, after obtaining the SSB transmitted through the best beam, the UE 103b may obtain a corresponding RO associated with the SSB. Then, in step 502, the UE 103b may determine an initial UL BWP for the UE based on the corresponding RO associated with the SSB.

According to some other embodiments of the present application, one SSB may be associated with two or more ROs. In this case, after obtaining the SSB transmitted through the best beam, the UE 103b may first determine one RO from the two or more ROs associated with the SSB based on the UE identity (ID), and then using the determined one RO to determine an initial UL BWP for the UE 103b. For example, for the radio resource control (RRC) inactive NR-Light UE, the UE ID may be an inactive-radio network temporary identifier (I-RNTI). For the RRC idle NR-Light UE, the UE ID may be a serving-temporary mobile subscriber identity (S-TMSI).

The index of the RO used for determining the initial UL BWP for the UE 103b may be determined based on following equation:

$$\text{The index of the RO} = \text{Mod (UE ID, the number of ROs associated with the SSB)}$$

For example, assuming that two ROs (e.g., RO #0 and RO #1) are associated with the same SSB #k, wherein k is larger than or equal to 0. Based on the above equation, for UE #0, the index of RO should be Mod (0, 2)=0. That is, the UE #0 may determine the initial UL BWP for the UE #0 based on RO #0. For UE #1, the index of RO should be Mod (1, 2)=1. That is, the UE #1 may determine the initial UL BWP for the UE #1 based on the RO #1.

After determining one RO associated with the SSB, the UE 103b may determine an initial UL BWP for the UE 103b based on the determined RO associated with the SSB.

According to some embodiments of the present application, the UE 103b may determine whether the RO is within the initial DL BWP for the UE 103b. In the case that the RO is within the initial DL BWP for the UE 103b, the UE 103b may determine the initial UL BWP for the UE 103b to be the initial DL BWP for the UE 103b.

For example, assuming that the initial DL BWP for the UE 103b may include 21 PRBs from PRB20 to PRB40 in the frequency domain, wherein PRB20 may refer to the PRB with the lowest frequency and PRB40 may refer to the PRB with the highest frequency in the bandwidth of the initial DL BWP. In addition, assuming that the RO includes 6 PRBs from PRB30 to PRB35, wherein PRB30 may refer to the PRB with the lowest frequency and PRB35 may refer to the PRB with the highest frequency in the bandwidth of the RO. In this example, since PRB30 to PRB35 is within PRB20 to PRB40 in the frequency domain, that is, the RO is within the initial DL BWP for the UE 103b, the UE 103b may determine the initial UL BWP for the UE 103b to be the initial DL BWP for the UE 103b. That is, the UE 103b may determine the initial UL BWP for the UE 103b including 41 PRBs from PRB20 to PRB40 in the frequency domain.

According to some other embodiments of the present application, the RO may be not within the initial DL BWP for the UE 103b. In these embodiments, the UE 103b may determine the initial DL BWP for the UE 103b based on the RO according to several methods illustrated below.

According to an embodiment of the present application, the UE 103b may determine a first PRB of the initial UL BWP to be a first PRB of the RO. The first PRB of the initial UL BWP may refer to the PRB with the lowest frequency in the bandwidth of the initial UL BWP. Similarly, the first PRB of the RO may refer to the PRB with the lowest frequency in the bandwidth of the RO. The specific method will be illustrated in FIG. 6 below.

Figure 6:
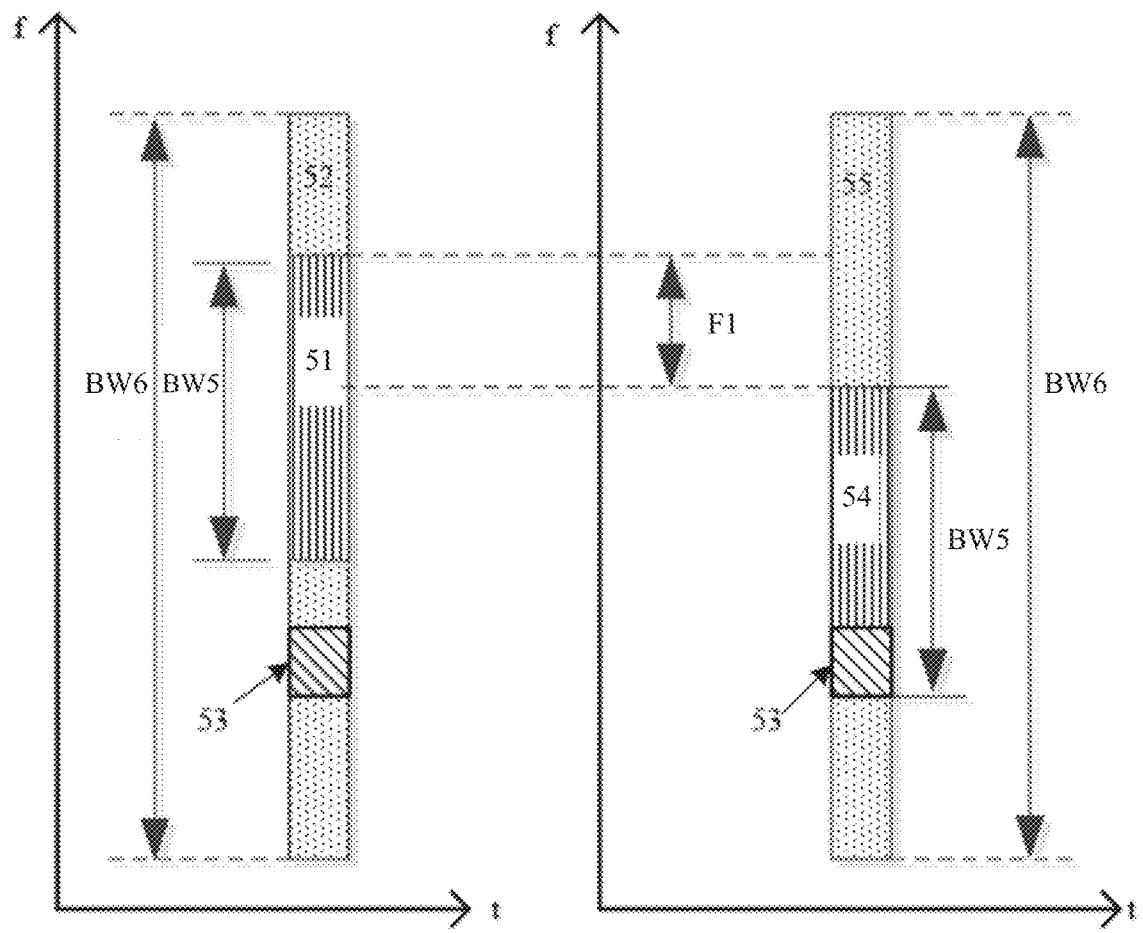
FIG. 6 illustrates a method for determining an initial UL BWP for a NR-Light UE according to an embodiment of the present application.

For example, FIG. 6 illustrates a method for determining an initial UL BWP for a NR-Light UE according to an embodiment of the present application.

As shown in the left part of the FIG. 6, reference sign 51 may refer to the initial DL BWP for the UE 103*b* which has a bandwidth BWS. Reference sign 52 may refer to the initial DL BWP for the normal UE 103*a* which has a bandwidth BW6. Reference sign 53 may refer to the RO associated with the SSB for the UE 103*b*. The RO may have one or more OFDM symbols in the time domain and one or more PRBs in the frequency domain. As shown in FIG. 6, the RO is located outside of the initial DL BWP for the UE 103*b*. To make the UE 103*b* to perform the random access procedure successfully, the UE 103*b* may float the initial UL BWP for the UE 103*b*. That is, the initial UL BWP for UE 103*b* may be not determined by the position of the initial DL BWP as in legacy, but is defined by the position of the RO. As shown in the right part of FIG. 6, the UE 103*b* may determine a first PRB of the initial UL BWP to be a first PRB of the RO. As a result, the reference sign 54 in the right part may refer to the determined initial UL BWP for UE 103*b*. The initial UL BWP 54 for UE 103*b* including the RO 53 also has a bandwidth BWS, but has a frequency offset F1 compared with the initial DL BWP 51 for UE 103*b*. Reference sign 55 may refer to the initial UL BWP for the normal UE 103*a* which has a bandwidth BW6.

For example, assuming that the initial DL BWP 51 for the UE 103*b* may include 21 PRBs from PRB40 to PRB60 in the frequency domain, wherein PRB40 may refer to the PRB with the lowest frequency and PRB 60 may refer to the PRB with the highest frequency in the bandwidth BWS; assuming that the initial DL BWP 52 for the UE 103*a* may include 51 PRBs from PRB20 to PRB70 in the frequency domain, wherein PRB20 may refer to the PRB with the lowest frequency and PRB70 may refer to the PRB with the highest frequency in the bandwidth BW6; and assuming that the RO 53 includes 6 PRBs from PRB30 to PRB35, wherein PRB30 may refer to the PRB with the lowest frequency and PRB 60 may refer to the PRB with the highest frequency in the bandwidth of the RO. In this example, the RO 53 (i.e., PRB30 to PRB35) is not within the initial DL BWP 51 (i.e., PRB40 to PRB60), to make the random access procedure to be performed successfully, the UE 103*b* may determine that PRB30 may be the first PRB of the initial UL BWP 54 for the UE 103*b*. That is, the determined initial UL BWP 54 for the UE 103*b* may include 21 PRBs from PRB30 to PRB50. The frequency offset F1 from the initial DL BWP 51 for the UE 103*b* and the initial UL BWP 54 for the UE 103*b* may be 10 PRBs.

According to another embodiment of the present application, the UE 103*b* may determine a last PRB of the initial UL BWP to be a last PRB of the RO. The last PRB of the initial UL BWP may refer to the PRB with the highest frequency in the bandwidth of the initial UL BWP. Similarly, the last PRB of the RO may refer to the PRB with the highest frequency in the bandwidth of the RO. The specific method will be illustrated in FIG. 7 below.

Figure 7:
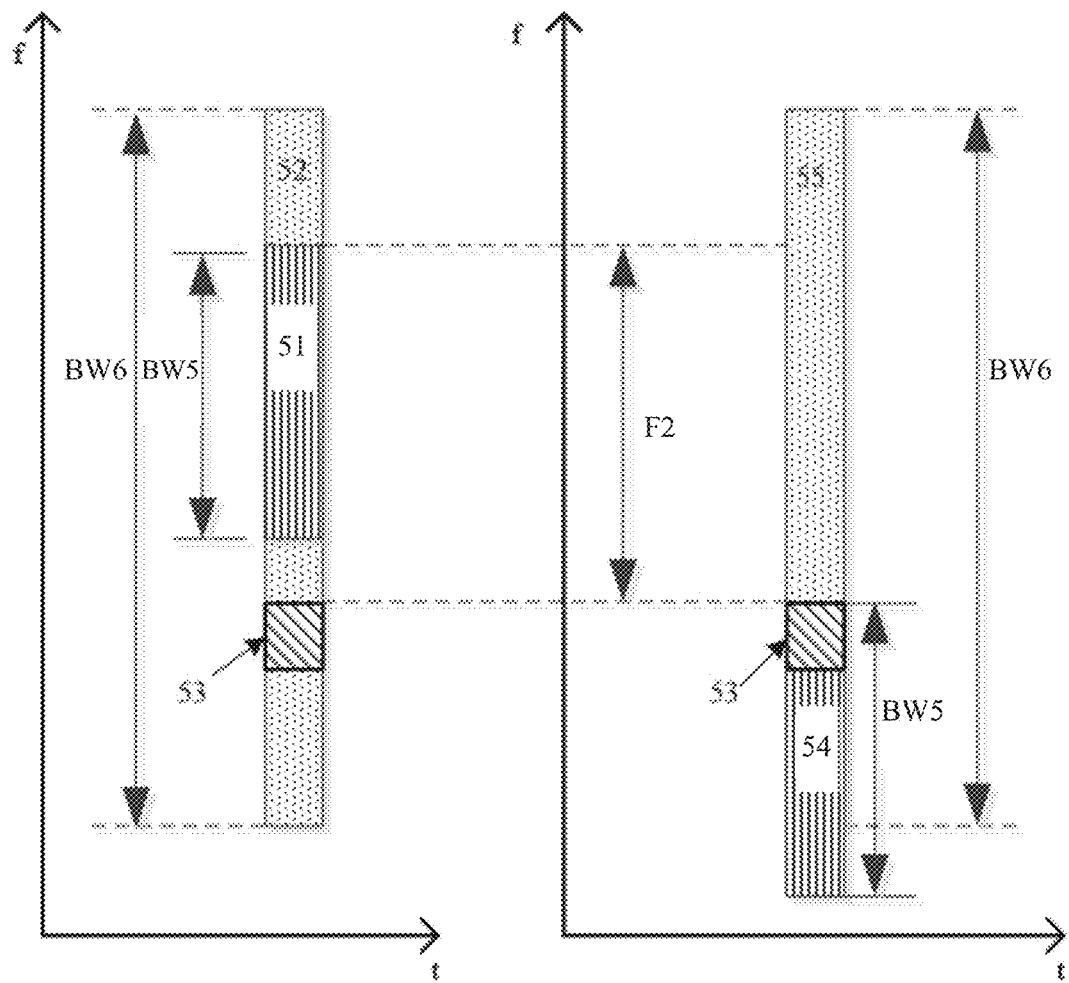
FIG. 7 illustrates a method for determining an initial UL BWP for a NR-Light UE according to another embodiment of the present application.

For example, FIG. 7 illustrates a method for determining an initial UL BWP for a NR-Light UE according to another embodiment of the present application.

As shown in the left part of the FIG. 7, reference sign 51 may refer to the initial DL BWP for the UE 103*b* which has a bandwidth BWS. Reference sign 52 may refer to the initial DL BWP for the normal UE 103*a* which has a bandwidth BW6. Reference sign 53 may refer to the RO associated with the SSB for the UE 103*b*. The RO may have one or more OFDM symbols in the time domain and one or more PRBs in the frequency domain. As shown in FIG. 7, the RO is located outside of the initial DL BWP for the UE 103*b*. To make the UE 103*b* to perform the random access procedure successfully, the UE 103*b* may float the initial UL BWP for the UE 103*b*. That is, the initial UL BWP for UE 103*b* may be not determined by the position of the initial DL BWP as in legacy, but is defined by the position of the RO. As shown in the right part of FIG. 7, the UE 103*b* may determine a last PRB of the initial UL BWP to be a last PRB of the RO. As a result, the reference sign 54 in the right part of FIG. 7 may refer to the determined initial UL BWP for UE 103*b*. The initial UL BWP 54 for UE 103*b* including the RO 53 also has a bandwidth BWS, but has a frequency offset F2 compared with the initial DL BWP 51 for UE 103*b*. Reference sign 55 may refer to the initial UL BWP for the normal UE 103*a* which has a bandwidth BW6.

For example, assuming that the initial DL BWP 51 for the UE 103*b* may include 21 PRBs from PRB40 to PRB60 in the frequency domain, wherein PRB40 may refer to the PRB with the lowest frequency and PRB60 may refer to the PRB with the highest frequency in the bandwidth BWS; assuming that the initial DL BWP 52 for the UE 103*a* may include 51 PRBs from PRB20 to PRB70 in the frequency domain, wherein PRB20 may refer to the PRB with the lowest frequency and PRB70 may refer to the PRB with the highest frequency in the bandwidth BW6; and assuming that the RO 53 includes 6 PRBs from PRB30 to PRB35, wherein PRB30 may refer to the PRB with the lowest frequency and PRB35 may refer to the PRB with the highest frequency in the bandwidth of the RO. In this example, the RO 53 (i.e., PRB30 to PRB35) is not within the initial DL BWP 51 (i.e., PRB40 to PRB60), to make the random access procedure to be performed successfully, the UE 103*b* may determine that PRB35 may be the last PRB of the initial UL BWP 54 for the UE 103*b*. That is, the determined initial UL BWP 54 for the UE 103*b* may include 21 PRBs from PRB15 to PRB35. The frequency offset F2 from the initial DL BWP 51 for the UE 103*b* and the initial UL BWP 54 for the UE 103*b* may be 25 PRBs.

According to yet another embodiment of the present application, the UE 103*b* may determine a centre PRB of the initial UL BWP for the UE 103*b* to be a first PRB of the RO. The first PRB of the RO may refer to the PRB with the lowest frequency in the bandwidth of the RO. The specific method will be illustrated in FIG. 8 below.

Figure 8:
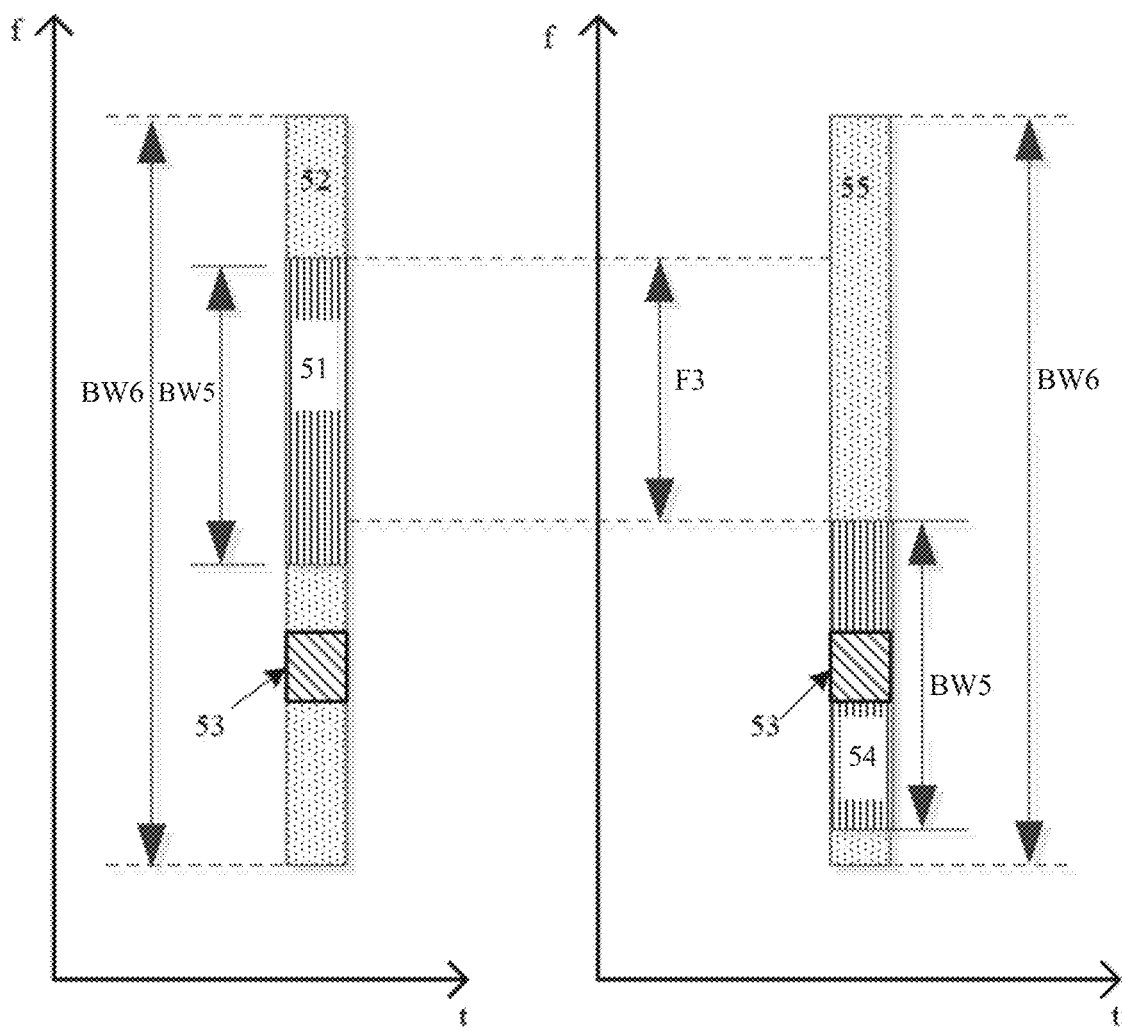
FIG. 8 illustrates a method for determining an initial UL BWP for a NR-Light UE according to yet another embodiment of the present application.

For example, FIG. 8 illustrates a method for determining an initial UL BWP for a NR-Light UE according to yet another embodiment of the present application.

As shown in the left part of the FIG. 8, reference sign 51 may refer to the initial DL BWP for the UE 103*b* which has a bandwidth BWS. Reference sign 52 may refer to the initial DL BWP for the normal UE 103*a* which has a bandwidth BW6. Reference sign 53 may refer to the RO associated with the SSB for the UE 103*b*. The RO may have one or more OFDM symbols in the time domain and one or more PRBs in the frequency domain. As shown in FIG. 8, the RO is located outside of the initial DL BWP for the UE 103*b*. To make the UE 103*b* to perform the random access procedure successfully, the UE 103*b* may float the initial UL BWP for the UE 103*b*. That is, the initial UL BWP for UE 103*b* may be not determined by the position of the initial DL BWP as in legacy, but is defined by the position of the RO. As shown in the right part of FIG. 8, the UE 103*b* may determine a centre PRB of the initial UL BWP for the UE 103*b* to be a first PRB of the RO. As a result, the reference sign 54 in the right part of FIG. 8 may refer to the determined initial UL BWP for UE 103*b*. The initial UL BWP 54 for UE 103*b* including the RO 53 also has a bandwidth BWS, but has a frequency offset F3 compared with the initial DL BWP 51 for UE 103*b*. Reference sign 55 may refer to the initial UL BWP for the normal UE 103*a* which has a bandwidth BW6.

For example, assuming that the initial DL BWP 51 for the UE 103*b* may include 21 PRBs from PRB40 to PRB60 in the frequency domain, wherein PRB40 may refer to the PRB with the lowest frequency and PRB60 may refer to the PRB with the highest frequency in the bandwidth BWS; assuming that the initial DL BWP 52 for the UE 103*a* may include 51 PRBs from PRB20 to PRB70 in the frequency domain, wherein PRB20 may refer to the PRB with the lowest frequency and PRB70 may refer to the PRB with the highest frequency in the bandwidth BW6; and assuming that the RO 53 includes 6 PRBs from PRB30 to PRB35, wherein PRB30 may refer to the PRB with the lowest frequency and PRB35 may refer to the PRB with the highest frequency in the bandwidth of the RO. In this example, the RO 53 (i.e., PRB30 to PRB35) is not within the initial DL BWP 51 (i.e., PRB40 to PRB60), to make the random access procedure to be performed successfully, the UE 103*b* may determine that PRB30 may be the centre PRB of the initial UL BWP 54 for the UE 103*b*. That is, the determined initial UL BWP 54 for the UE 103*b* whose centre PRB should be PRB30 may include 21 PRBs from PRB20 to PRB40. The frequency offset F3 from the initial DL BWP 51 for the UE 103*b* and the initial UL BWP 54 for the UE 103*b* may be 20 PRBs.

According to some embodiments of the present application, using which method of the method illustrated in FIG. 6, the method illustrated in FIG. 7, and the method illustrated in FIG. 8 may be predefined between the base station and the NR-Light UE. That is, the base station and the NR-Light UE may use the same pre-defined method to determine the initial UL BWP for the NR-Light UE.

According to some other embodiments of the present application, the base station and the NR-Light UE (e.g., the UE 103*b*) may select one method from the method illustrated in FIG. 6, the method illustrated in FIG. 7, and the method illustrated in FIG. 8 to determine the initial UL BWP for the NR-Light UE. The selection criteria performed by the base station and NR-Light UE are also the same.

In an embodiment of the present application, the selecting may be based on whether the determined initial UL BWP for the UE is within a bandwidth of a control resource set (e.g., CORESET #0) indicated in the synchronization information. The bandwidth of the control resource set (e.g., CORESET #0) indicated in the synchronization information may be the same as the initial DL BWP for the normal UE (for example, the UE 103*a*).

For example, assuming that the initial DL BWP 51 for the UE 103*b* may include 21 PRBs from PRB40 to PRB60 in the frequency domain; assuming that the initial DL BWP 52 for the UE 103*a* may include 51 PRBs from PRB20 to PRB70 in the frequency domain; and assuming that the RO 53 includes 6 PRBs from PRB30 to PRB35. Based on the method illustrated in FIG. 6, the determined initial UL BWP 54 for the UE 103*b* may be from PRB30 to PRB50, which is within the PRB20 to PRB70 of the initial DL BWP 52 for the UE 103*a*. Based on the method illustrated in FIG. 7, the determined initial UL BWP 54 for the UE 103*b* may be from PRB15 to PRB35, which is not within of the PRB20 to PRB70 of the initial DL BWP 52 for the UE 103*a*. Based on the method illustrated in FIG. 8, the determined initial UL BWP 54 for the UE 103*b* may be from PRB20 to PRB40, which is within of the PRB20 to PRB70 of the initial DL BWP 52 for the UE 103*a*. Given this, the UE 103*b* and the base station 101 may select the method illustrated in FIG. 6 or FIG. 8 (i.e. determining a first PRB of the initial UL BWP to be a first PRB of the RACH occasion or determining a centre PRB of the initial UL BWP to be a first PRB of the RACH occasion) but not select the method illustrated in FIG. 7 (i.e., determining a last physical resource block (PRB) of the initial UL BWP to be a last PRB of the RACH occasion) because the determined UL BWP for the NR-Light UE in FIG. 7 is not within the initial DL BWP (i.e., a bandwidth of a control resource set indicated in the synchronization information) for the normal UE.

In another embodiment of the present application, the selecting may be based on a frequency offset between the determined initial UL BWP for the UE 103*b* and an initial DL BWP for the UE 103*b*.

For example, assuming that the initial DL BWP 51 for the UE 103*b* may include 21 PRBs from PRB40 to PRB60 in the frequency domain; assuming that the initial DL BWP 52 for the UE 103*a* may include 51 PRBs from PRB20 to PRB70 in the frequency domain; and assuming that the RO 53 includes 6 PRBs from PRB30 to PRB35. As stated above, based on the method illustrated in FIG. 6, the frequency offset F1 may be 10 PRBs. Based on the method illustrated in FIG. 7, the frequency offset F2 may be 25 PRBs. Based on the method illustrated in FIG. 8, the frequency offset F2 may be 20 PRBs. Given this, the UE and the base station may select the method illustrated in FIG. 6 (i.e. determining a first PRB of the initial UL BWP to be a first PRB of the RACH occasion) since the frequency offset F1 between the determined initial UL BWP for the UE 103*b* and an initial DL BWP for the UE 103*b* is smallest.

After determining the initial UL BWP for the UE 103*b*, the UE 103*b* may transmit a preamble in the RO to the base station. The preamble may be selected from a group of preambles configured by the base station. For example, before transmitting the preamble, the UE 103*b* may receive configuration information indicating a group of preambles. The group of preambles may be specific for the NR-Light UEs and be different from the preamble(s) for the normal UEs, such that when the gNB detects a preamble within this group, it would know that the preamble is transmitted from a NR-Light UE. After receiving configuration information indicating the group of preambles, the UE 103*b* may transmit one preamble from the the group of preambles to the base station.

For a two-step random access procedure, the UE 103*b* may also transmit an MsgA message of the two-step random access procedure in the determined initial UL BWP for the UE 103*b*. The MsgA message may include data (for example, UE ID) transmitted on a physical uplink shared channel (PUSCH). Before transmitting the MsgA message of the two-step random access procedure, the UE may receive scheduling information for transmitting an MsgA message of the two-step random access procedure in the determined initial UL BWP for the UE 103*b*. For the case that the allocated PUSCH resource is outside of the initial UL BWP of the UE 103*b*, the UE 103*b* may switch to the PUSCH bandwidth (BW) after transmitting the RACH preamble to transmit the PUSCH transmission (for example, UE ID).

For a four-step random access procedure, after transmitting the preamble in the RO, the UE 103*b* may receive scheduling information for transmitting an Msg3 message of the four-step random access procedure in the determined initial UL BWP for the UE from the base station. After receiving the scheduling information for transmitting the Msg3 message, the UE 103*b* may transmit the Msg3 message of the four-step random access procedure in the determined initial UL BWP for the UE 103*b*. In an embodiment of the present application, the Msg3 message of the four-step random access procedure may be an RRC setup.

Figure 9:
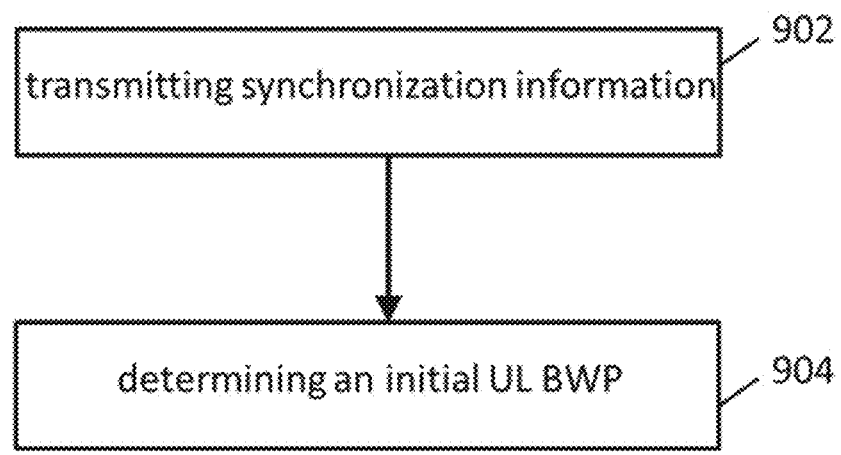
FIG. 9 illustrates a method for a random access procedure according to some other embodiments of the present application.

FIG. 9 is a flow chart illustrating a method for a random access procedure according to some other embodiments of the present application. The method may be performed by a base station, for example, the base station 101 as shown in FIG. 1.

As shown in FIG. 9, in step 902, the base station 101 may transmit synchronization information to a NR-Light UE (for example, the UE 103*b* as shown in FIG. 1). In fact, the synchronization information may also be transmitted to a normal UE (for example, the UE 103*a* as shown in FIG. 1) within the coverage of the base station. The synchronization information may include one or more SSBs. Each SSB may be associated with a beam transmitted from the BS 101.

According to some embodiments of the present application, the base station may transmit configuration information indicating a group of preambles. The group of preambles may be specific for the NR-Light UEs and is different from the preamble(s) for the normal UEs, such that when the gNB detects a preamble within this group, it would know that the preamble is transmitted from a NR-Light UE.

After transmitting the synchronization information and the configuration information indicating the group of preambles, the base station 101 may receive a preamble from the group of preambles in an RO associated with a SSB from the UE 103*b*.

The RO associated with the SSB may be determined by the UE 103*b* based on the method illustrated in FIG. 5. As stated in FIG. 5, after receiving the synchronization information, the UE 103*b* may obtain the SSB transmitted through the best beam. The best beam may refer to the beam with the best signal quality. Then the UE 103*b* may obtain one or more ROs associated with one SSB transmitted through the best beam. According to some embodiments of the present application, one SSB may be associated with one RO. In this case, after obtaining the SSB transmitted through the best beam, the UE may obtain a corresponding RO associated with the SSB. Then, the UE 103*b* may transmit a preamble from the group of preambles specific for the NR-Light UEs on the RO to the base station 101. According to some embodiments of the present application, one SSB may be associated with more than one RO. In this case, after obtaining the SSB transmitted through the best beam, the UE 103*b* may determine an RO from the more than one RO associated with the SSB based on the UE identity (ID), and then the UE 103*b* may transmit a preamble from the group of preambles specific for the NR-Light UEs to the base station 101 on the determined one RO.

Since the preamble is included in the group of preambles specific for the NR-Light UEs configured by the base station 101, after receiving the preamble on the RO, the base station 101 may know that the preamble and the RO are for a NR-Light UE. Then, in step 904, the base station 101 may determine an initial UL BWP for the UE 103*b* based on the RO.

According to some embodiments of the present application, the BS 101 may determine whether the RO is within the initial DL BWP for the UE 103*b*. In the case that the RO is within the initial DL BWP for the UE 103*b*, the BS 101 may determine the initial UL BWP for the UE 103*b* to be the initial DL BWP for the UE 103*b*.

According to some other embodiments of the present application, the RO may be not within the initial DL BWP for the UE 103*b*. In these embodiments, the BS 101 may determine the initial DL BWP for the UE 103*b* based on several methods illustrated below.

According to an embodiment of the present application, the UE 103*b* may determine a first PRB of the initial UL BWP to be a first PRB of the RO. The first PRB of the initial UL BWP may refer to the PRB with the lowest frequency in the bandwidth of the initial UL BWP. Similarly, the first PRB of the RO may refer to the PRB with the lowest frequency in the bandwidth of the RO. The specific method is illustrated in FIG. 6 above.

According to another embodiment of the present application, the BS 101 may determine a last PRB of the initial UL BWP to be a last PRB of the RO. The last PRB of the initial UL BWP may refer to the PRB with the highest frequency in the bandwidth of the initial UL BWP. Similarly, the last PRB of the RO may refer to the PRB with the highest frequency in the bandwidth of the RO. The specific method is illustrated in FIG. 7 above.

According to yet another embodiment of the present application, the BS 101 may determine a centre PRB of the initial UL BWP for the UE 103*b* to be a first PRB of the RO. The first PRB of the RO may refer to the PRB with the lowest frequency in the bandwidth of the RO. The specific method is illustrated in FIG. 8 above.

According to some embodiments of the present application, using which method of the method illustrated in FIG. 6, the method illustrated in FIG. 7, and the method illustrated in FIG. 8 may be predefined between the base station and the NR-Light UE. That is, the base station and the NR-Light UE may use the same pre-defined method to determine the initial UL BWP for the NR-Light UE.

According to some other embodiments of the present application, the base station and the NR-Light UE (e.g., the UE 103*b*) may select one method from the methods illustrated in FIG. 6, the method illustrated in FIG. 7, and the method illustrated in FIG. 8 to determine the initial UL BWP for the NR-Light UE. The selection criteria performed by the base station and NR-Light UE are also the same.

In an embodiment of the present application, the selecting may be based on whether the determined initial UL BWP for the UE is within a bandwidth of a control resource set indicated in the synchronization information as illustrated in FIG. 5. The bandwidth of the control resource set indicated in the synchronization information may be the same as the initial DL BWP for the normal UE (for example, the UE 103*a*).

In another embodiment of the present application, the selecting may be based on a frequency offset between the determined initial UL BWP for the UE 103*b* and an initial DL BWP for the UE 103*b* as illustrated in FIG. 5.

For a two-step random access procedure, the BS 101 may also receive an MsgA message of the two-step random access procedure in the determined initial UL BWP for the UE 103*b*. The MsgA message may include data (for example, UE ID) transmitted in a physical uplink shared channel (PUSCH). Before receiving the MsgA message of the two-step random access procedure, the BS 101 may transmit scheduling information for transmitting the MsgA message of the two-step random access procedure in the determined initial UL BWP for the UE 103*b*.

For a four-step random access procedure, after receiving the preamble in the RO, the BS 101 may transmit scheduling information for transmitting an Msg3 message of the four-step random access procedure in the determined initial UL BWP for the UE from the base station. After transmitting the scheduling information for transmitting the Msg3 message, the BS 101 may receive the Msg3 message of the four-step random access procedure in the determined initial UL BWP for the UE 103b. For example, the Msg3 message of the four-step random access procedure may be an RRC setup.

Figure 10:
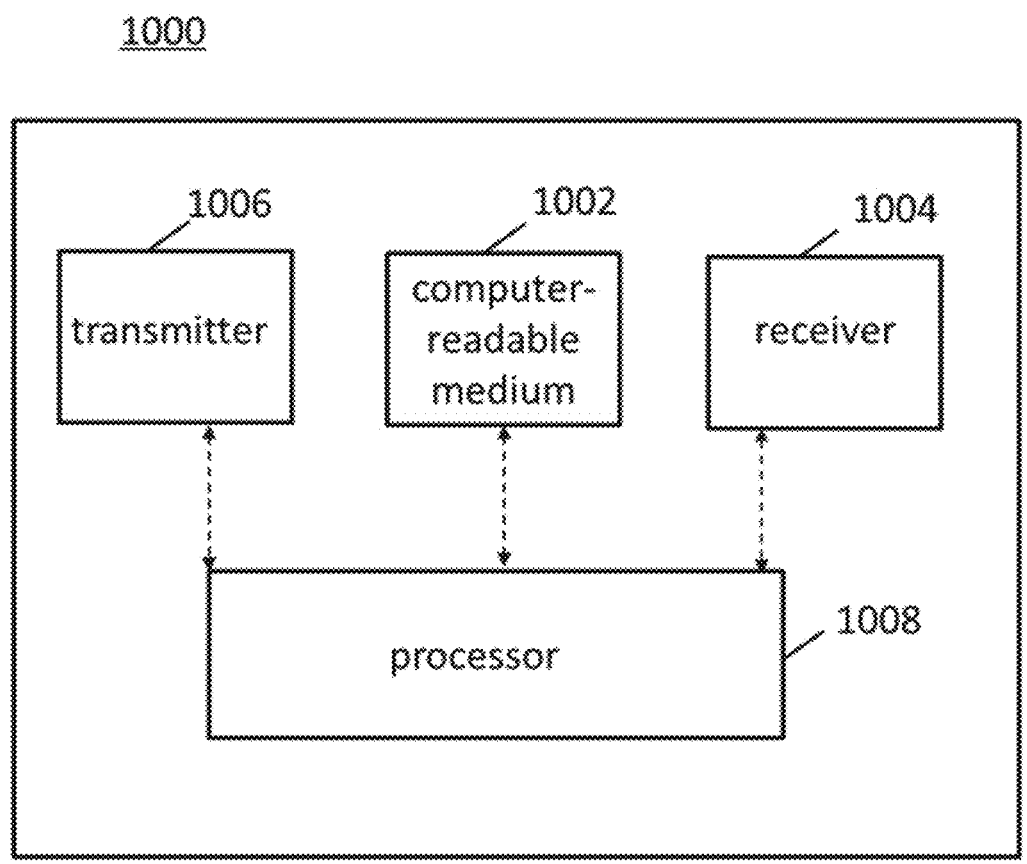
FIG. 10 illustrates a simplified block diagram of an apparatus for a random access procedure according to some embodiments of the present application.

FIG. 10 illustrates a simplified block diagram of an apparatus 1000 for a random access procedure according to some embodiments of the present application. The apparatus 1000 may be a UE 103b as shown in FIG. 1.

Referring to FIG. 10, the apparatus 1000 may include at least one non-transitory computer-readable medium 1002, at least one receiver 1004, at least one transmitter 1006, and at least one processor 1008. In some embodiment of the present application, at least one receiver 1004 and at least one transmitter 1006 and be integrated into at least one transceiver. The at least one non-transitory computer-readable medium 1002 may have computer executable instructions stored therein. The at least one processor 1008 may be coupled to the at least one non-transitory computer-readable medium 1002, the at least one receiver 1004 and the at least one transmitter 1006. The computer executable instructions can be programmed to implement a method with the at least one receiver 1004, the at least one transmitter 1006 and the at least one processor 1008. The method can be a method according to an embodiment of the present application, for example, the method shown in FIG. 5.

Figure 11:
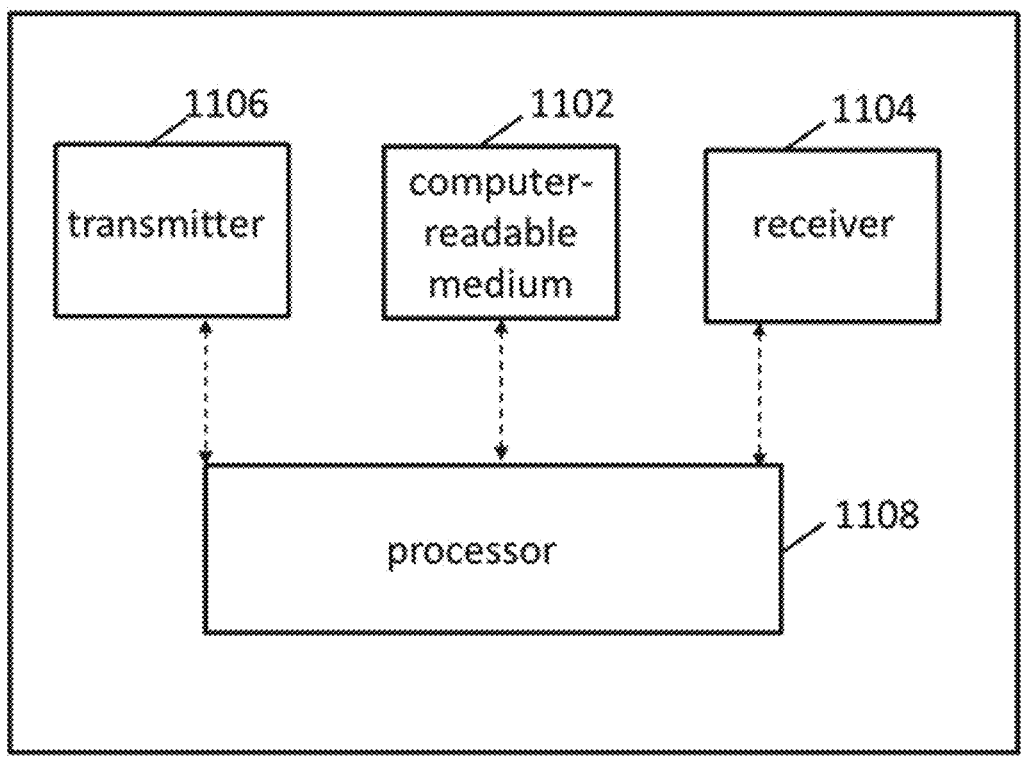
FIG. 11 illustrates a simplified block diagram of an apparatus for a random access procedure according to some other embodiments of the present application.

FIG. 11 illustrates a simplified block diagram of an apparatus 1100 for a random access procedure according to some other embodiments of the present application. The apparatus 1100 may be a base station 101 as shown in FIG. 1.

Referring to FIG. 11, the apparatus 1100 may include at least one non-transitory computer-readable medium 1102, at least one receiver 1104, at least one transmitter 1106, and at least one processor 1108. In some embodiment of the present application, at least one receiver 1104 and at least one transmitter 1106 and be integrated into at least one transceiver. The at least one non-transitory computer-readable medium 1102 may have computer executable instructions stored therein. The at least one processor 1108 may be coupled to the at least one non-transitory computer-readable medium 1102, the at least one receiver 1104 and the at least one transmitter 1106. The computer executable instructions can be programmed to implement a method with the at least one receiver 1104, the at least one transmitter 1106 and the at least one processor 1108 The method can be a method according to an embodiment of the present application, for example, the method shown in FIG. 9.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for emotion recognition from speech, including a processor and a memory. Computer programmable instructions for implementing a method for emotion recognition from speech are stored in the memory, and the processor is configured to perform the computer programmable instructions to implement the method for emotion recognition from speech. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for emotion recognition from speech as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

The invention claimed is:

1. A method, comprising:
receiving, at a user equipment (UE), synchronization information; and
determining an initial uplink (UL) bandwidth part (BWP) for the UE containing a random access channel (RACH) occasion associated with the synchronization information;
receiving configuration information indicating a group of preambles; and
transmitting a preamble of the group of preambles during the RACH occasion.

2. The method of claim 1, wherein determining the initial UL BWP for the UE comprises:
determining the initial UL BWP for the UE to be an initial downlink (DL) BWP for the UE in a case that the RACH occasion is within the initial DL BWP for the UE.

3. The method of claim 1, wherein determining the initial UL BWP for the UE comprises:
determining a first physical resource block (PRB) of the initial UL BWP to be a first PRB of the RACH occasion.

4. The method of claim 1, wherein determining the initial UL BWP for the UE comprises:
determining a last physical resource block (PRB) of the initial UL BWP to be a last PRB of the RACH occasion.

5. The method of claim 1, wherein determining the initial UL BWP for the UE comprises:
determining a center physical resource block (PRB) of the initial UL BWP to be a first PRB of the RACH occasion.

6. The method of claim 1, wherein determining the initial UL BWP for the UE comprises selecting one of the following options:
determining a first physical resource block (PRB) of the initial UL BWP to be a first PRB of the RACH occasion;
determining a last PRB of the initial UL BWP to be a last PRB of the RACH occasion; or determining a center PRB of the initial UL BWP to be a first PRB of the RACH occasion;
wherein the selecting is based on whether the determined initial UL BWP for the UE is within a bandwidth of a control resource set indicated in the synchronization information.

7. The method of claim 1, wherein determining the initial UL BWP for the UE comprises selecting one of the following options:
determining a first physical resource block (PRB) of the initial UL BWP to be a first PRB of the RACH occasion;
determining a last PRB of the initial UL BWP to be a last PRB of the RACH occasion; or
determining a center PRB of the initial UL BWP to be a first PRB of the RACH occasion;
wherein the selecting is based on a frequency offset between the determined initial UL BWP for the UE and an initial DL BWP for the UE.

8. The method of claim 1, further comprising:
determining the RACH occasion from one or more RACH occasions associated with the synchronization information based on an identity of the UE.

9. The method of claim 1, wherein:
the UE operates with reduced capability as at least one of limited bandwidth, reduced power consumption, limited reception resources, or flexible latency; and
the preambles of the group of preambles are dedicated for the UE with reduced capability.

10. The method of claim 1, further comprising:
receiving scheduling information for transmitting a random access message of a random access procedure in the determined initial UL BWP for the UE, the random access message comprising an Msg3 message or an MsgA message; and
transmitting the random access message of the random access procedure in the determined initial UL BWP for the UE.

11. An apparatus, comprising:
a receiver;
a transmitter; and
a processor coupled to the receiver and the transmitter, the processor configured to cause the apparatus to:
receive synchronization information; and
determine an initial uplink (UL) bandwidth part (BWP) for the apparatus based on a random access channel (RACH) occasion associated with the synchronization information.

12. The apparatus of claim 11, wherein the processor is configured to cause the apparatus to determine the initial UL BWP for the apparatus as an initial downlink (DL) BWP for the apparatus in a case that the RACH occasion is within the initial DL BWP for the apparatus.

13. The apparatus of claim 11, wherein the processor is configured to cause the apparatus to determine a first physical resource block (PRB) of the initial UL BWP to be a first PRB of the RACH occasion.

14. The apparatus of claim 11, wherein the processor is configured to cause the apparatus to determine a last physical resource block (PRB) of the initial UL BWP to be a last PRB of the RACH occasion.

15. The apparatus of claim 11, wherein the processor is configured to cause the apparatus to determine a center physical resource block (PRB) of the initial UL BWP to be a first PRB of the RACH occasion.

16. An apparatus, comprising:
a receiver;
a transmitter; and
a processor coupled to the receiver and the transmitter, the processor configured to cause the apparatus to:
transmit, to a user equipment (UE), synchronization information; and
determine an initial uplink (UL) bandwidth part (BWP) for the UE based on a random access channel (RACH) occasion associated with the synchronization information;
receive a preamble of a group of preambles allocated for the UE; and
identify the UE operating with reduced capability based on the received preamble.

17. The apparatus of claim 16, wherein the processor is configured to cause the apparatus to determine the initial UL BWP for the UE as an initial downlink (DL) BWP for the UE in a case that the RACH occasion is within the initial DL BWP for the UE.

18. The apparatus of claim 16, wherein the processor is configured to cause the apparatus to determine a first physical resource block (PRB) of the initial UL BWP to be a first PRB of the RACH occasion.

19. The apparatus of claim 16, wherein the processor is configured to cause the apparatus to determine a last physical resource block (PRB) of the initial UL BWP to be a last PRB of the RACH occasion.

20. The apparatus of claim 16, wherein the processor is configured to cause the apparatus to determine a center physical resource block (PRB) of the initial UL BWP to be a first PRB of the RACH occasion.

* * * * *